(12) United States Patent
Tsien et al.

(10) Patent No.: US 12,452,173 B2
(45) Date of Patent: Oct. 21, 2025

(54) REDUCED MESH LANE ROUTING

(71) Applicant: Advanced Micro Devices, Inc., Santa Clara, CA (US)

(72) Inventors: Benjamin Tsien, Santa Clara, CA (US); Pravesh Gupta, Bangalore (IN)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/545,846

(22) Filed: Dec. 19, 2023

(65) Prior Publication Data

US 2025/0202823 A1   Jun. 19, 2025

(51) Int. Cl.
*H04L 47/122* (2022.01)
*H04L 47/125* (2022.01)
*H04L 47/56* (2022.01)

(52) U.S. Cl.
CPC .......... *H04L 47/122* (2013.01); *H04L 47/125* (2013.01); *H04L 47/564* (2013.01)

(58) Field of Classification Search
CPC ..... H04L 45/127; H04L 45/06; G06F 9/3885; G06F 9/2888; G06F 9/30123
See application file for complete search history.

(56) References Cited

U.S. PATENT DOCUMENTS

| 8,934,347 | B1 * | 1/2015 | Bratt | G06F 21/79 370/237 |
| 2009/0285222 | A1 * | 11/2009 | Hoover | H04L 45/06 370/397 |
| 2013/0168672 | A1 * | 7/2013 | Lewis | H01L 22/22 257/E21.531 |
| 2014/0149766 | A1 * | 5/2014 | Samih | H04L 45/127 713/320 |
| 2018/0196710 | A1 | 7/2018 | Iyer et al. | |
| 2019/0243797 | A1 | 8/2019 | Garibay et al. | |
| 2022/0327276 | A1 * | 10/2022 | Seshan | G06F 13/382 |
| 2022/0359464 | A1 | 11/2022 | Zaman et al. | |
| 2023/0114271 | A1 * | 4/2023 | Pappu | G06F 11/1004 710/113 |
| 2023/0376534 | A1 | 11/2023 | Dann et al. | |

FOREIGN PATENT DOCUMENTS

WO   2013063485 A1   5/2013

OTHER PUBLICATIONS

International Search Report and Written Opinion in PCT Application No. PCT/US2024/033883 mailed Sep. 27, 2024, By: Authorized Officer: Jeong Rok Yang.

* cited by examiner

*Primary Examiner* — Chirag R Patel

(74) *Attorney, Agent, or Firm* — Greenberg Traurig, LLP

(57) ABSTRACT

The disclosed device includes multiple mesh lanes for sending data packets across the device. The device also includes a control circuit that can detect a low bandwidth workload and reroute data packets to avoid one or more mesh lane. The control circuit can then disable the avoided mesh lanes. Various other methods, systems, and computer-readable media are also disclosed.

20 Claims, 6 Drawing Sheets

REDUCED MESH LANE ROUTING

BACKGROUND

In computing device architectures having multiple dies or sockets (e.g., a multi-chiplet architecture), a data fabric can be used for sending data between die components. The data fabric can support sending data packets across a socket or die (e.g., from a component at one end of the die to another component at an opposite end of the die). Such a fabric can be organized as a mesh, and interfaces that cross this mesh can form a "lane" (e.g., mesh lane). The mesh lanes often correspond to memory channels such that data packets from a memory channel can be routed through the corresponding mesh lane. During certain low bandwidth workloads, the mesh lanes can be underutilized, therefore wasting power.

BRIEF DESCRIPTION OF THE DRAWINGS

The accompanying drawings illustrate a number of exemplary implementations and are a part of the specification. Together with the following description, these drawings demonstrate and explain various principles of the present disclosure.

Figure 1:
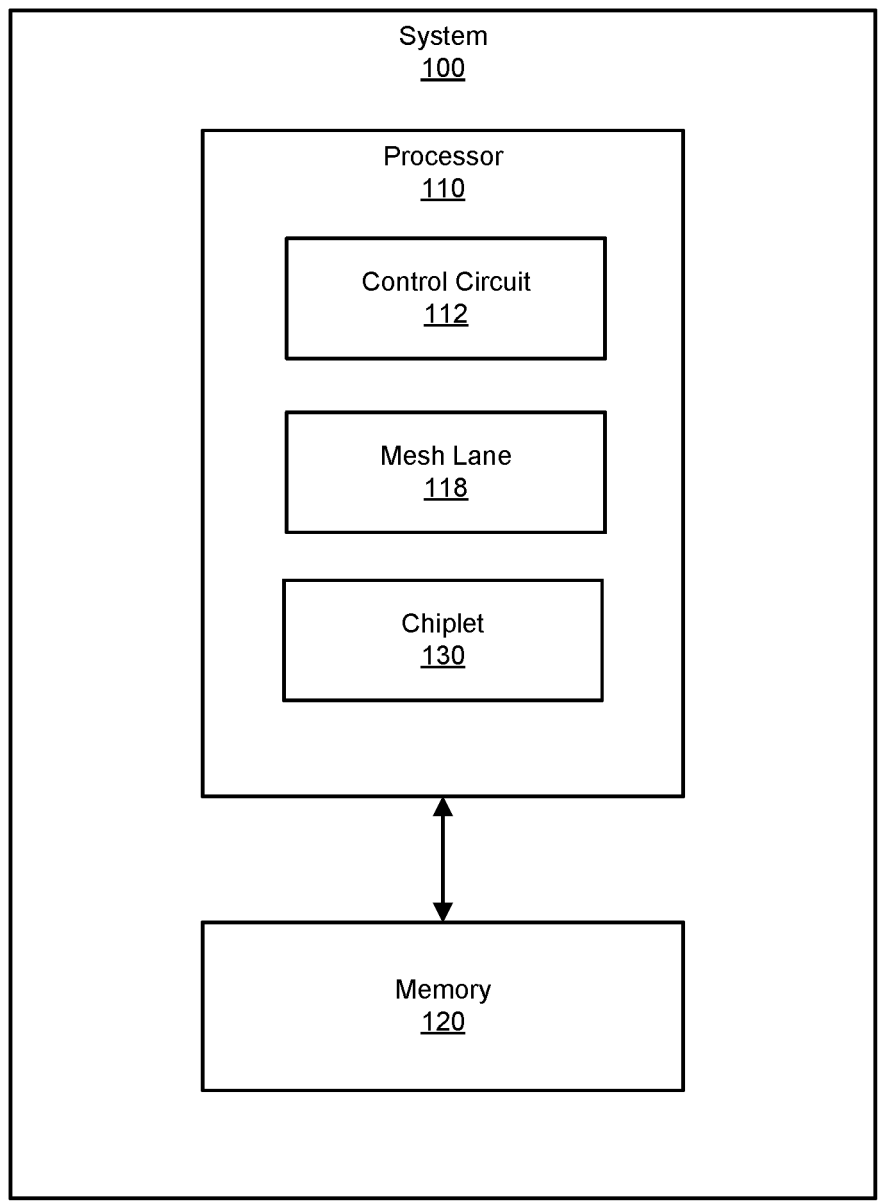
FIG. 1 is a block diagram of an exemplary system for reduced mesh lane routing.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the present disclosure covers all modifications, equivalents, and alternatives falling within the scope of the appended claims.

DETAILED DESCRIPTION

The present disclosure is generally directed to reduced mesh lane routing for example during stuttering (e.g., an idle period of memory accessing via holding workloads in a buffer). As will be explained in greater detail below, implementations of the present disclosure detect a low bandwidth workload and, in response to the detection, reroute data packets to avoid at least one mesh lane of a plurality of mesh lanes. Because the workload is low bandwidth, one or more mesh lanes can be disabled to reduce power consumption without incurring latency or other slowdowns.

In one implementation, a device for reduced mesh lane routing during stuttering includes a plurality of mesh lanes for sending data packets across the device and a control circuit configured to (i) reroute data packets to avoid at least one mesh lane of the plurality of mesh lanes based on a low bandwidth workload, and (ii) disable the at least one mesh lane of the plurality of mesh lanes.

In some examples, the control circuit is further configured to detect a workload increase and in some examples further configured to enable the disabled at least one mesh lane of the plurality of mesh lanes based on the workload increase. In some examples, the control circuit is further configured to complete sending previously routed data packets before disabling the at least one mesh lane of the plurality of mesh lanes.

In some examples, rerouting the data packets comprises dynamically reconfiguring a packet routing scheme for the plurality of mesh lanes during live traffic on the plurality of mesh lanes. In some examples, dynamically reconfiguring the packet routing scheme includes maintaining packet deadlines. In some examples, dynamically reconfiguring the packet routing scheme includes maintaining a packet ordering. In some examples, dynamically reconfiguring the packet routing scheme includes allowing packet delays.

In some examples, the device includes a plurality of chiplets, wherein the plurality of mesh lanes sends data packets to the plurality of chiplets. In some examples, a mesh lane of the plurality of mesh lanes sends data packets across a first chiplet of the plurality of chiplets to a second chiplet of the plurality of heterogeneous chiplets.

In some examples, avoiding the at least one mesh lane of the plurality of mesh lanes corresponds to avoiding at least one port of a plurality of ports of the device. In some examples, the low bandwidth workload corresponds to a low multimedia workload. In some examples, the low bandwidth workload corresponds to a low display workload. In some examples, the low bandwidth workload corresponds to a system idle.

In one implementation, a system for reduced mesh lane routing during stuttering includes a physical memory, a plurality of chiplets, a plurality of mesh lanes for sending data packets across the plurality of chiplets, and a control circuit configured to (i) detect a low bandwidth workload for the plurality of chiplets, (ii) dynamically reconfigure a packet routing scheme for the plurality of mesh lanes to avoid at least one mesh lane of the plurality of mesh lanes based on the low bandwidth workload, and (iii) disable the at least one mesh lane of the plurality of mesh lanes.

In some examples, the control circuit is further configured to detect a workload increase, and in some examples further configured to enable the disabled at least one mesh lane of the plurality of mesh lanes based on the workload increase. In some examples, the control circuit is further configured to complete sending previously routed data packets before disabling the at least one mesh lane of the plurality of mesh lanes.

In some examples, dynamically reconfiguring the packet routing scheme includes maintaining packet deadlines or maintaining a packet ordering or allowing packet delays. In some examples, a mesh lane of the plurality of mesh lanes sends data packets across a first chiplet of the plurality of chiplets to a second chiplet of the plurality of chiplets. In some examples, the low bandwidth workload corresponds to a low multimedia workload or a low display workload. In some examples, the low bandwidth workload corresponds to a system idle.

In one example, a method for reduced mesh lane routing during stuttering includes (i) detecting a low bandwidth workload for a plurality of chiplets interconnected with a plurality of mesh lanes, (ii) detecting completion of sending data packets using a first packet routing scheme for the plurality of mesh lanes based on the low bandwidth workload, (iii) in response to detecting the completion, dynamically reconfiguring the first packet routing scheme to a second packet routing scheme that avoids at least one mesh lane of the plurality of mesh lanes based on the completion, and (iv) disabling the at least one mesh lane of the plurality of mesh lanes.

In some examples, the method further includes detecting a workload increase, and enabling the disabled at least one mesh lane of the plurality of mesh lanes based on the workload increase. In some examples, dynamically reconfiguring the packet routing scheme includes maintaining packet deadlines or maintaining a packet ordering or allowing packet delays. In some examples, the low bandwidth workload corresponds to a low multimedia workload or a low display workload. In some examples, the low bandwidth workload corresponds to a system idle.

Features from any of the implementations described herein can be used in combination with one another in accordance with the general principles described herein. These and other implementations, features, and advantages will be more fully understood upon reading the following detailed description in conjunction with the accompanying drawings and claims.

The following will provide, with reference to FIGS. 1-6, detailed descriptions of reduced mesh lane routing. Detailed descriptions of example systems will be provided in connection with FIGS. 1, 2, and 3. Detailed descriptions of corresponding processes and/or methods will also be provided in connection with FIGS. 4, 5, and 6.

FIG. 1 is a block diagram of an example system 100 for reduced mesh lane routing. System 100 corresponds to a computing device, such as a desktop computer, a laptop computer, a server, a tablet device, a mobile device, a smartphone, a wearable device, an augmented reality device, a virtual reality device, a network device, and/or an electronic device. As illustrated in FIG. 1, system 100 includes one or more memory devices, such as memory 120. Memory 120 generally represents any type or form of volatile or non-volatile storage device or medium capable of storing data and/or computer-readable instructions. Examples of memory 120 include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, and/or any other suitable storage memory.

As illustrated in FIG. 1, example system 100 includes one or more physical processors, such as processor 110. Processor 110 generally represents any type or form of hardware-implemented processing unit capable of interpreting and/or executing computer-readable instructions. In some examples, processor 110 accesses and/or modifies data and/or instructions stored in memory 120. Examples of processor 110 include, without limitation, chiplets (e.g., smaller and in some examples more specialized processing units that can coordinate as a single chip), microprocessors, microcontrollers, Central Processing Units (CPUs), graphics processing units (GPUs), Field-Programmable Gate Arrays (FPGAs) that implement softcore processors, Application-Specific Integrated Circuits (ASICs), systems on chip (SoCs), digital signal processors (DSPs), Neural Network Engines (NNEs), accelerators, graphics processing units (GPUs), portions of one or more of the same, variations or combinations of one or more of the same, and/or any other suitable physical processor.

As further illustrated in FIG. 1, processor 110 includes a control circuit 112, a mesh lane 118, and a chiplet 130. Control circuit 112 corresponds to circuitry and/or instructions for coordinating reduced mesh lane routing and in some implementations corresponds to and/or interfaces with one or more controllers, such as a power management controller, a memory interface controller, and/or other routing controller. Chiplet 130 corresponds to one or more processing components and in some examples can be specialized for particular tasks, such as display, multimedia, etc. In some examples, processor 110 can include multiple different iterations of chiplet 130.

Mesh lane 118 generally corresponds to circuitry for sending data packets, and in some examples send data packets across a die (e.g., processor 110), such as across one chiplet to reach another chiplet. In some implementations, mesh lane 118 corresponds to a particular memory channel such that data packets from/to the memory channel can be routed through mesh lane 118. In some implementations, mesh lane 118 can be mapped to multiple memory channels and/or multiple mesh lanes (e.g., iterations of mesh lane 118) can be mapped to a memory channel. Although FIG. 1 illustrates a single mesh lane 118 for simplicity, in other examples processor 110 and/or system 100 can include multiple iterations of mesh lane 118 of different types.

Figure 2:
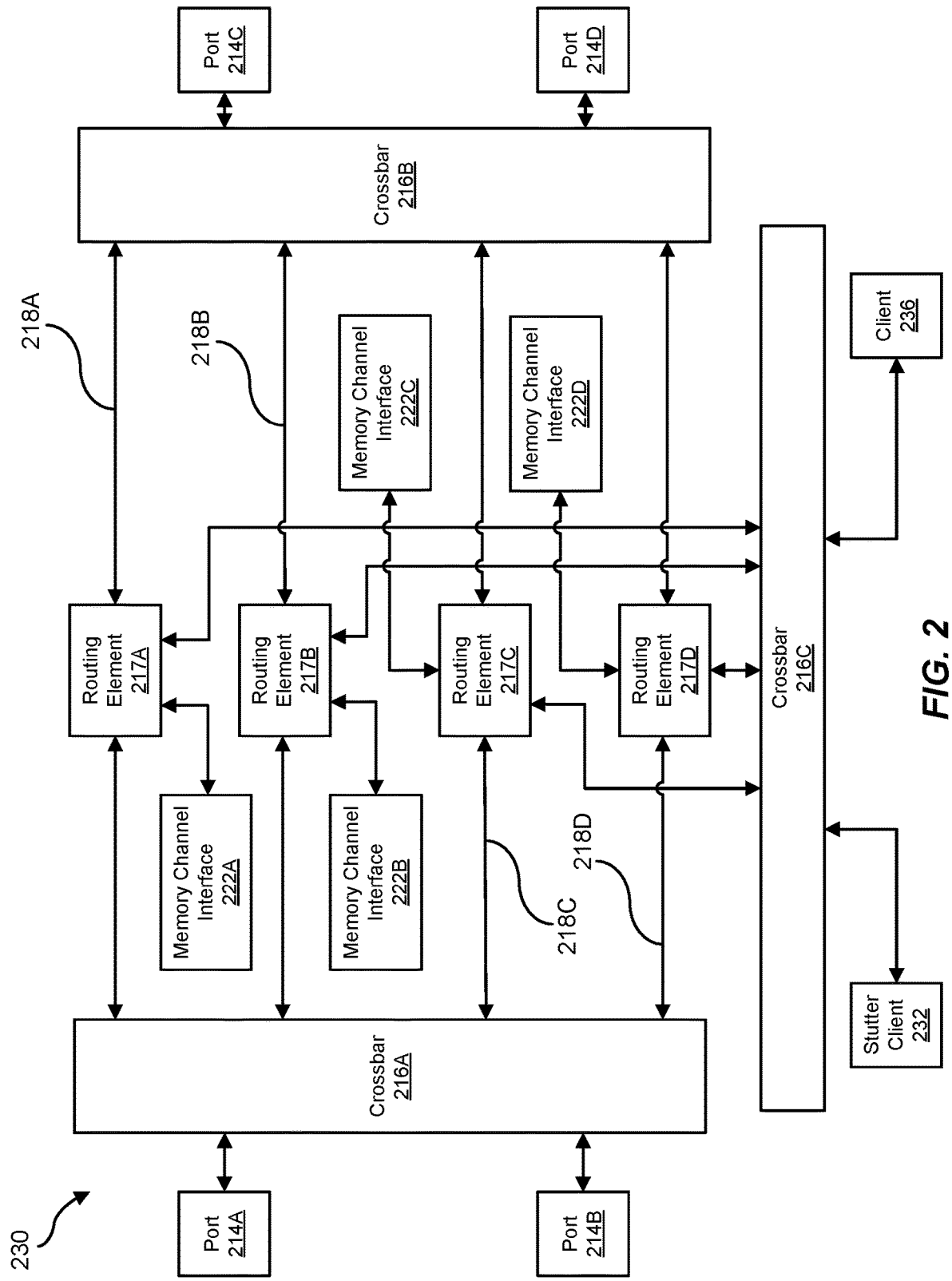
FIG. 2 is a block diagram of an exemplary mesh network incorporating reduced mesh lane routing.

FIG. 2 illustrates a die 230 corresponding to an iteration of processor 110 and/or chiplet 130. As illustrated in FIG. 2, die 230 includes a port 214A, a port 214B, a port 214C, and a port 214D, each corresponding to iterations of a data port for sending and/or receiving data packets to/from components of a system (e.g., system 100) and, in some examples, components that can be external to die 210 (e.g., off die). Die 230 also includes a crossbar 216A, a crossbar 216B, a crossbar 216C, a routing element 217A, a routing element 217B, a routing element 217C, and a routing element 217D, each corresponding to iterations of a routing element (e.g., circuitry for receiving data packets and forwarding the data packets along a specific path in accordance with an applied routing scheme). Die 230 further includes a memory channel interface 222A, a memory channel interface 222B, a memory channel interface 222C, and a memory channel interface 222D, each corresponding to iterations of a memory channel (e.g., circuitry for sending/receiving data packets to/from a memory channel of a memory device such as memory 120). In addition, die 230 further includes a mesh lane 218A, a mesh lane 218B, a mesh lane 218C, and a mesh lane 218D, each corresponding to iterations of mesh lane 118.

As illustrated in FIG. 2, each mesh lane (which in some examples can extend from crossbar 216A to crossbar 216B) corresponds to a memory channel. For instance, mesh lane 218A corresponds to memory channel interface 222A (and its associated memory channel) such that data packets from memory channel interface 222A are routed to mesh lane 218A via routing element 217A. Similarly, mesh lane 218B corresponds to memory channel interface 222B, mesh lane 218C corresponds to memory channel interface 222C, and mesh lane 218D corresponds to memory channel interface 222D. Thus, data packets originating from or sent to a memory channel can be routed through the corresponding mesh lane, which can be the closest mesh lane to the source or destination.

In some examples, data packets can be sent across die 230 (e.g., from the left to the right). Although FIG. 2 and the examples herein describe data packets generally sent from the left to the right of die 230 (e.g., as further indicated by the illustrated arrows to illustrate more clearly possible routes), in other examples, data packets can be sent from the right to the left or along other appropriate paths/directions even if not indicated by arrows. Data packets can be sent across die 230 for instance when a data packet originating outside of die 230 (e.g., inter-chiplet traffic) is received on a port, such as port 214A or port 214B, to be routed across die 230 to port 214C or port 214D, which can then be sent to a destination outside of die 230. For instance, a data packet received at port 214A can be forwarded to crossbar 216A. Crossbar 216A can correspond to an interface between ports (e.g., ports 214A-214B) and mesh lanes (e.g., mesh lanes 218A-218D) for inter-chiplet traffic and can have a routing table corresponding to the current routing scheme for sending packets along an appropriate mesh lane. Based on the destination outside of die 230, crossbar 216A can forward the data packet along mesh lane 218A (which can be indicated by the routing table), to send the data packet to port 214C (which can be selected by crossbar 216B based on the destination such as by using the routing table). Similarly, crossbar 216B can correspond to an interface between ports (e.g., ports 214C-214D) and mesh lanes (e.g., mesh lanes 218A-218D) for inter-chiplet traffic.

In addition, crossbar 216C can correspond to an interface between various clients, such as a stutter client 232 and a client 236 and the mesh lanes (e.g., mesh lanes 218A-218D via routing elements 217A-217D, respectively). Moreover, FIG. 2 illustrates a simplified example architecture of interfaces, connections, routes, etc. For instance, although FIG. 2 illustrates one arrow between client 236 and crossbar 216C, in some examples, (e.g., for high bandwidth clients), client 236 can have multiple links to crossbar 216C that can include additional crossbars and/or routing elements for accessing the mesh lanes and/or memory channels. In other words, the arrows depicted in FIG. 2 can correspond to one or more links and can further include crossbars and/or other routing elements. Stutter client 232 can correspond to a processing component capable of stutter mode (e.g., pausing memory accesses by accessing a previously-filled activity buffer) and in some examples can represent multiple different stutter clients. Client 236 can correspond to another processing component which in some examples can be a high bandwidth client, a stutter client, etc. and in some examples can represent multiple different clients.

As described further herein, the crossbars (e.g., crossbars 216A-216C) can use a reduced mesh lane routing scheme to route traffic to/from local clients (e.g., stutter client 232 and/or client 236) and/or local memory (e.g., via one or more of memory channels 222A-222D) arriving from the mesh lanes (e.g., one or more of mesh lanes 218A-218D) to fewer ports (e.g., fewer of ports 214A-214D than used in a default routing scheme). Additionally, the crossbars can use the reduced mesh lane routing scheme to route inter-chiplet traffic arriving from fewer ports on one neighbor chiplet to the same fewer ports on another neighbor chiplet via fewer mesh lanes.

Figure 3:
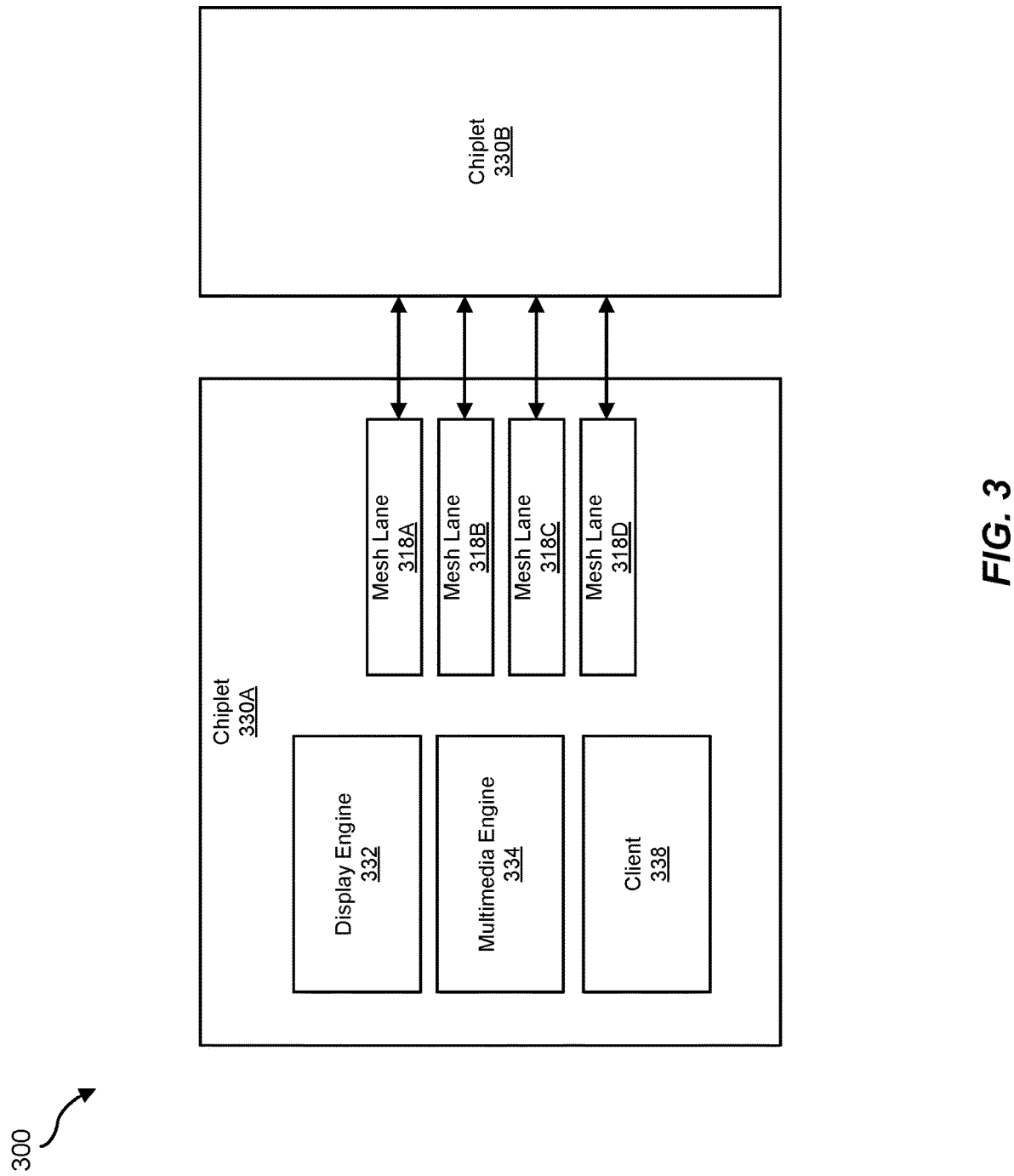
FIG. 3 is a block diagram of an exemplary multi-chiplet architecture.

Although FIG. 2 illustrates a simplified example, in other implementations die 230 can include more iterations and configurations of the above-mentioned features, such as additional or fewer mesh lanes, additional or fewer ports (e.g., for a 1:1 ratio between ports and mesh lanes, for instance when high bandwidth is needed between chiplets). Moreover, FIG. 2 illustrates a single die. In other examples, a multi-chiplet architecture can include multiple dies. For example, a second die placed to the right of die 230 can interface with die 230 via port 214C and/or port 214D (e.g., connecting to a port 214A and/or port 214B of a second iteration of die 230). FIG. 3 illustrates a simplified example of a multi-chiplet architecture.

FIG. 3 illustrates a system 300 corresponding to system 100 and/or processor 110. FIG. 3 includes a display engine 332, a multimedia engine 334, a client 338 a chiplet 330A, and a chiplet 330B, each corresponding to different iteration of chiplet 130 and/or die 230 and/or components thereof. At least chiplet 330A further includes a mesh lane 318A (corresponding to mesh lane 218A), a mesh lane 318B (corresponding to mesh lane 218B), a mesh lane 318C (corresponding to mesh lane 218B), and a mesh lane 318D (corresponding to mesh lane 218D).

Certain processing components or chiplets can have a stutter mode in which the chiplet is idle with respect to accessing memory while its previously-filled buffer is exhausted. For example, chiplet 330A includes display engine 332 (which can correspond to an iteration of stutter client 232) can have a display buffer for buffering display frames (e.g., by accessing a memory such as memory 120) which if filled to a buffer threshold, allows display engine 332 to enter stutter mode, which further corresponds to a low (memory) bandwidth workload.

Chiplet 330A also includes multimedia engine 334 can correspond to, for example a video engine, audio engine, etc. Multimedia engine 334 (which can correspond to an iteration of stutter client 232) can include a multimedia buffer (e.g., a video and/or audio buffer) such that multimedia engine 334 can also support stutter mode. Chiplet 330A further includes client 338 (which can correspond to an iteration of client 236) representing other clients of chiplet 330A.

Chiplet 330A and chiplet 330B correspond to chiplets (e.g., neighboring chiplets in some examples) which can have different types of workloads. Although the mesh lanes of chiplet 330A (e.g., mesh lanes 318A-318D) are described herein, in other examples, other mesh lanes (e.g., of other dies) and/or a greater number of mesh lanes can be implemented. In addition, the chiplets in system 300 (e.g., chiplet 330A and/or chiplet 330B and/or other chiplets not illustrated in FIG. 3) can be the same (e.g., homogenous chiplets) or different (e.g., heterogeneous chiplets). For example, some chiplets can include only stutter clients some chiplets can include a mix of stutter clients with other clients, some chiplets can include high-bandwidth clients, etc. In addition, some chiplets can include memory along with corresponding mesh lanes whereas some other chiplets can include ports without memory or mesh lanes.

As described herein, system 300 can have a low bandwidth workload, which can correspond to one or more of display engine 332 in stutter mode, multimedia engine 334 in stutter mode, chiplet 330A in a low power or idle state, and chiplet 330B in a low power or idle state. A control circuit (e.g., control circuit 112 which in some examples corresponds to a fabric control circuit that can manage a data fabric including network/routing elements as in FIG. 2) can detect this low bandwidth workload and in response, reroute data packets (e.g., by dynamically reconfiguring a routing scheme) to avoid at least one of the mesh lanes while still using enough of the mesh lanes to prevent bottlenecks for the low bandwidth workload. For example, the control circuit can apply a reduced mesh lane routing scheme during stutter, such that mesh lane 318C and mesh lane 318D are unused. Control circuit can accordingly disable (e.g., reduce power consumption, power gate, or otherwise power off) the unused mesh lanes (e.g., mesh lane 318C and mesh lane 318D) to reduce power consumption. In some implementations, the corresponding memory lanes remain enabled (e.g. are not disabled with the unused mesh lanes) such that memory capacity is not reduced or otherwise taken offline. Rather, disabling the mesh lanes can include rerouting traffic for the corresponding memory lanes through other routes (e.g., another crossbar, on-die routing elements, etc.) that can include the remaining enabled mesh lanes. When the control circuit detects a workload increase (e.g., end of stutter), the control circuit can re-enable one to all of the disabled mesh lanes (e.g., one or both of mesh lane 318C and mesh lane 318D). In some examples, based on changing workloads, the control circuit can reconfigure the routing scheme to reduce/enable a number of mesh lanes as needed.

In some examples, a reduced mesh lane routing scheme can, in addition to disabling mesh lanes, include disabling of other routing elements and/or links, with appropriate reconfiguring of remaining routing elements. One or more ports can be disabled, with corresponding crossbars reconfigured to map were enable ports to fewer enabled mesh lanes. For example, returning to FIG. 2, port 214A and port 214C can be disabled and in some implementations further powered off. Corresponding portions of crossbar 216A and crossbar 216B can also be powered off, such as input/output crossbar ports corresponding to the unused mesh lanes and/or unused inter-chiplet ports, internal buffers, and/or internal routing control and data paths.

Turning back to FIG. 3, in some examples, the reduced mesh lane routing scheme can consider packet requirements, such as real time requirements, ordering requirements, etc. For example, display engine 332 can have a hard real-time requirement corresponding to a display interface because failing to meet the display interface deadline can cause a visible screen corruption. Display engine 332 can use a reorder buffer such that as long as reordering is completed by the hard real-time deadline, packets are generally free to take any path as well as arrive out of order. However, for dynamic route reconfiguration, the fabric control circuit can be required for such unordered traffic to be flushed (e.g., complete sending) from mesh lanes before disabling mesh lanes. For instance, the entire fabric across multiple chiplets (see, e.g., FIG. 2) can flush traffic in areas of the fabric being reconfigured to be avoided by client traffic (such as display traffic) before the fabric powers off the selected mesh lanes along with corresponding inter-chiplet ports, and/or parts of corresponding crossbars.

In some implementations, flushing traffic for unordered (e.g., hard real-time) clients such as display engine 332 can be done without a fence that blocks traffic on specific paths, which by waiting for all outstanding responses can guarantee no outstanding requests on mesh lanes to be powered off. A lack of a fence can result in request and response packets taking both old paths (e.g., paths of the previous routing scheme) and new paths (e.g., paths of the reconfigured routing scheme) can be present at the same time in the network/fabric such that the fabric controller can only safely power off mesh lanes after confirming packets in the old paths have been flushed. When powering on the mesh lanes again (e.g., exiting the dynamically reconfigured routing scheme), similar flushing is not needed.

The fabric control circuit can manage flushing traffic in various ways. In some examples, each component, such as mesh lanes, chiplet ports, crossbars, memory controllers, etc., can report its own network status (e.g., "flushed") in the routing scheme such that the combined flushed statuses can indicate readiness for each component to be shut off. In some examples, each request packet can indicate what routing scheme is used (e.g., in the packet header) such that the fabric control circuit can track (e.g., using a counter) how many incomplete packet transactions are pending in the old paths. In yet other examples, the fabric control circuit can wait for system idle, such as during a stutter idle phase in which traffic is already stopped, to proceed with dynamically reconfiguring the routing scheme. In such examples, the system can remain in the reconfigured routing scheme until stutter exit.

Multimedia engine 334 can have a soft real time or non-real time requirement in that multimedia engine 334 can have longer term deadlines, but operate far enough ahead such that changes in instantaneous bandwidth do not necessarily break the deadline. However, traffic can be required to follow a same strict path to guarantee same address ordering (e.g., for read-after-write, write-after-write, and/or write-after-read ordering of requests to the same address and/or block size address such as a cache line). For dynamic route reconfiguration, the control circuit can insert a fence to block additional packets from being sent on the new path until responses to all previously sent packets via the old path have been received.

Figure 4:
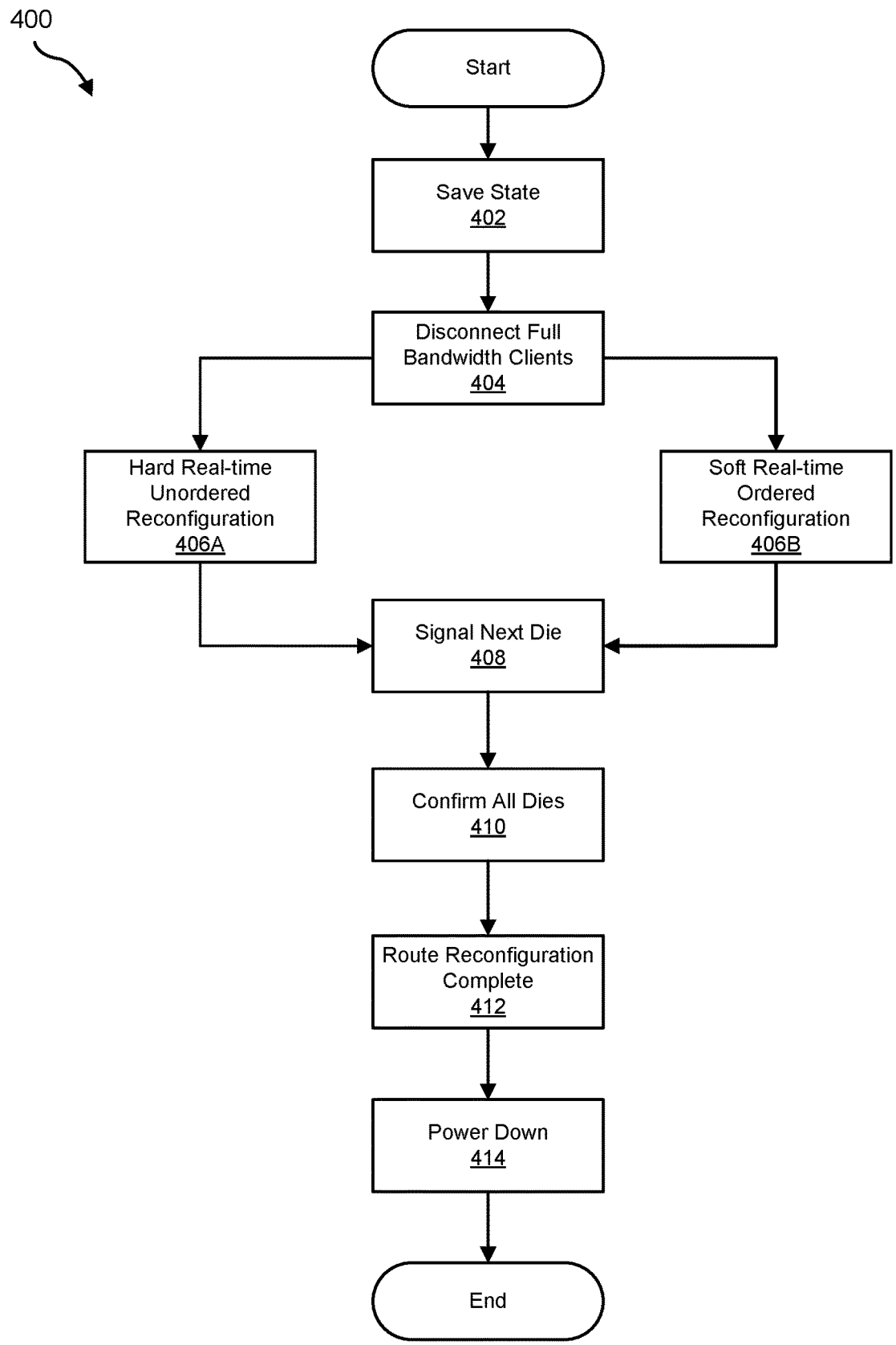
FIG. 4 is a flow diagram of an exemplary stutter operation using reduced mesh lane routing.

In one example, the control circuit can initiate or detect a stutter mode (and/or low power state) and in response dynamically reconfigure a current routing scheme to a reduced mesh lane routing scheme, as part of a power down sequence coordinated across multiple dies/chiplets. FIG. 4 illustrates an example flowchart 400 of stutter mode entry, such as multimedia stutter entry. After the control circuit decides on stutter mode entry, at save state 402, a die (e.g., a root die of, for example, system 300 such as chiplet 330A) can save its state.

The die can continue to disconnect full bandwidth clients 404 for disabling its components (e.g., clients), which can include each component dynamically reconfiguring its respective routing scheme to the reduced mesh lane routing scheme. An entry condition for the dynamic reconfiguration (e.g., reducing mesh lanes) can include certain high bandwidth clients becoming idle, such as by disconnecting (or otherwise disconnecting from the network) these high bandwidth clients. The dynamic reconfiguration can also depend on packet requirements of each client. Hard real-time unordered clients, such as display engine 332, can continue with hard real-time unordered reconfiguration 406A. Soft real-time ordered clients, such as multimedia engine 334, can continue with soft real-time ordered reconfiguration 406B. In some examples, other components can immediately change to the reduced mesh lane routing scheme, such as a memory coherency controller that can change to the reduced mesh lane routing scheme for routing responses. Other clients (e.g., client 338) can in some examples also immediately change to the reduced mesh lane routing scheme as needed.

At hard real-time unordered reconfiguration 406A, display engine 332 can immediately change to the reduced mesh lane routing scheme for requests. As described above, packets can be unordered, allowing any path to be taken, allowing immediate reconfiguration (although when exiting the reduced mesh lane routing scheme, such unordered packets can require flushing from their old/current paths before exiting the reduced mesh lane routing scheme). At soft real-time ordered reconfiguration 406B, multimedia engine 334 can execute a hardware fence blocking new requests until all outstanding requests are completed. For example, a counter that increments on requests sent and decrements on responses received, can track outstanding requests. Once this counter reaches zero, multimedia engine 334 can change to the reduced mesh lane routing scheme and unblock requests to complete the hardware fence.

At signal next die 408, the die (e.g., root die) can signal a next (e.g. in a leaf direction) die that, in response to the signal, can perform its own route reconfiguration (e.g., performing save state 402 through route reconfiguration complete 412) as well as signaling further dies (e.g., performing signal next die 408). In some examples, these signals can correspond to a multi-chiplet protocol for coordinating powering down to a lower power state. In some examples, confirmation signals can return (e.g., from leaf dies to the root die) for confirm all dies 410.

At confirm all dies 410, the control circuit can receive indications that the various chiplets have completed route reconfiguration (e.g., changed to the reduced mesh lane routing).

Continuing to route reconfiguration complete 412, the control circuit can wait until each client (of the die) signals their respective route reconfigurations are complete. In some examples, the clients can signal various milestones to indicate completion of route reconfiguration, such as when the last full mesh lane-routed request before reconfiguration has exited its pipeline (e.g., as indicated by the counter reaching zero), when the hardware fence is complete (which can include waiting for all outstanding transactions in the prior route to complete), and/or other indications of packets (e.g., requests or responses) using the full mesh lane routing scheme have been drained in all queues and pipelines. Once the control circuit confirms route reconfiguration (e.g., packets drained) of every client of all dies, the control circuit can proceed to power down 414.

In some examples, power down 414 can include disabling the unused mesh lanes (e.g., mesh lane 318C and mesh lane 318D) in accordance with the reduced mesh lane routing. Power down 414 can further include fabric and memory controller power/clock gating, DRAM low power state, voltage regulator low current state, powering down chiplet links, powering down a phase-locked loop (PLL), and/or clock tree frequency reduction (e.g., by bypassing to a slower reference clock or clock tree gating), etc. When the stutter mode (and/or low power state) exits, the control circuit can re-enable the disabled mesh lanes, power on the power gated components (e.g., reversing power down 414), and reconfigure the various chiplets from the reduced mesh lane routing to a full mesh lane routing or other appropriate routing scheme. In some examples, multimedia engine 334 can implement another delay to wait for requests in the reduced mesh lane routing to complete before reconfiguring.

Figure 5:
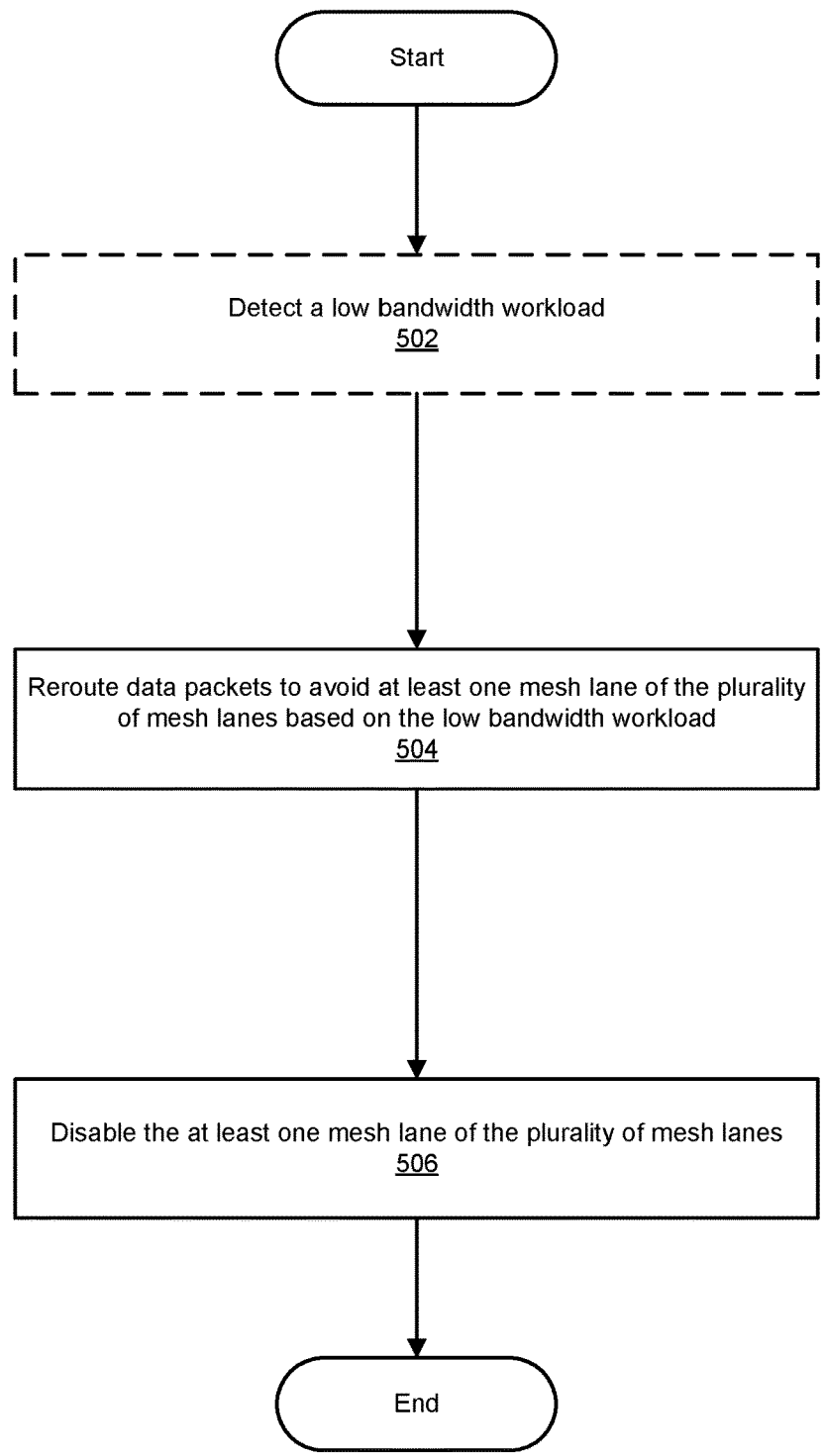
FIG. 5 is a flow diagram of an exemplary method for reduced mesh lane routing.

FIG. 5 is a flow diagram of an exemplary computer-implemented method 500 for reduced mesh lane routing. The steps shown in FIG. 5 can be performed by any suitable circuit, device, and/or computing system, including the system(s) illustrated in FIGS. 1, 2, and/or 3. In one example, each of the steps shown in FIG. 5 represent an algorithm whose structure includes and/or is represented by multiple sub-steps, examples of which will be provided in greater detail below.

As illustrated in FIG. 5, at optional step 502 one or more of the systems described herein detect a low bandwidth workload. For example, control circuit 112 can detect a low bandwidth workload of chiplet 130.

In some examples, the low bandwidth workload corresponds to a low multimedia workload. In some examples, the low bandwidth workload corresponds to a low display workload.

At step 504 one or more of the systems described herein reroute data packets to avoid at least one mesh lane of the plurality of mesh lanes based on the low bandwidth workload. For example, control circuit 112 can, in response to the low bandwidth workload, reroute data packets to avoid at least one iteration of mesh lane 118.

The systems described herein can perform step 504 in a variety of ways. In one example, control circuit 112 can be further configured to complete sending previously routed data packets before disabling the at least one iteration of mesh lane 118. In some examples, rerouting the data packets can include dynamically reconfiguring a packet routing scheme for the plurality of mesh lanes. In some examples, dynamically reconfiguring the packet routing scheme includes maintaining a packet ordering. In some examples, dynamically reconfiguring the packet routing scheme includes allowing packet delays.

At step 506 one or more of the systems described herein disable the at least one mesh lane of the plurality of mesh lanes. For example, control circuit 112 can disable the at least one iteration of mesh lane 118 (e.g., the mesh lane avoided in step 504).

In some examples, control circuit 112 can further detect a workload increase (e.g., an end to the low bandwidth workload), and in response to detecting the workload increase, enable the disabled at least one iteration of mesh lane 118.

Figure 6:
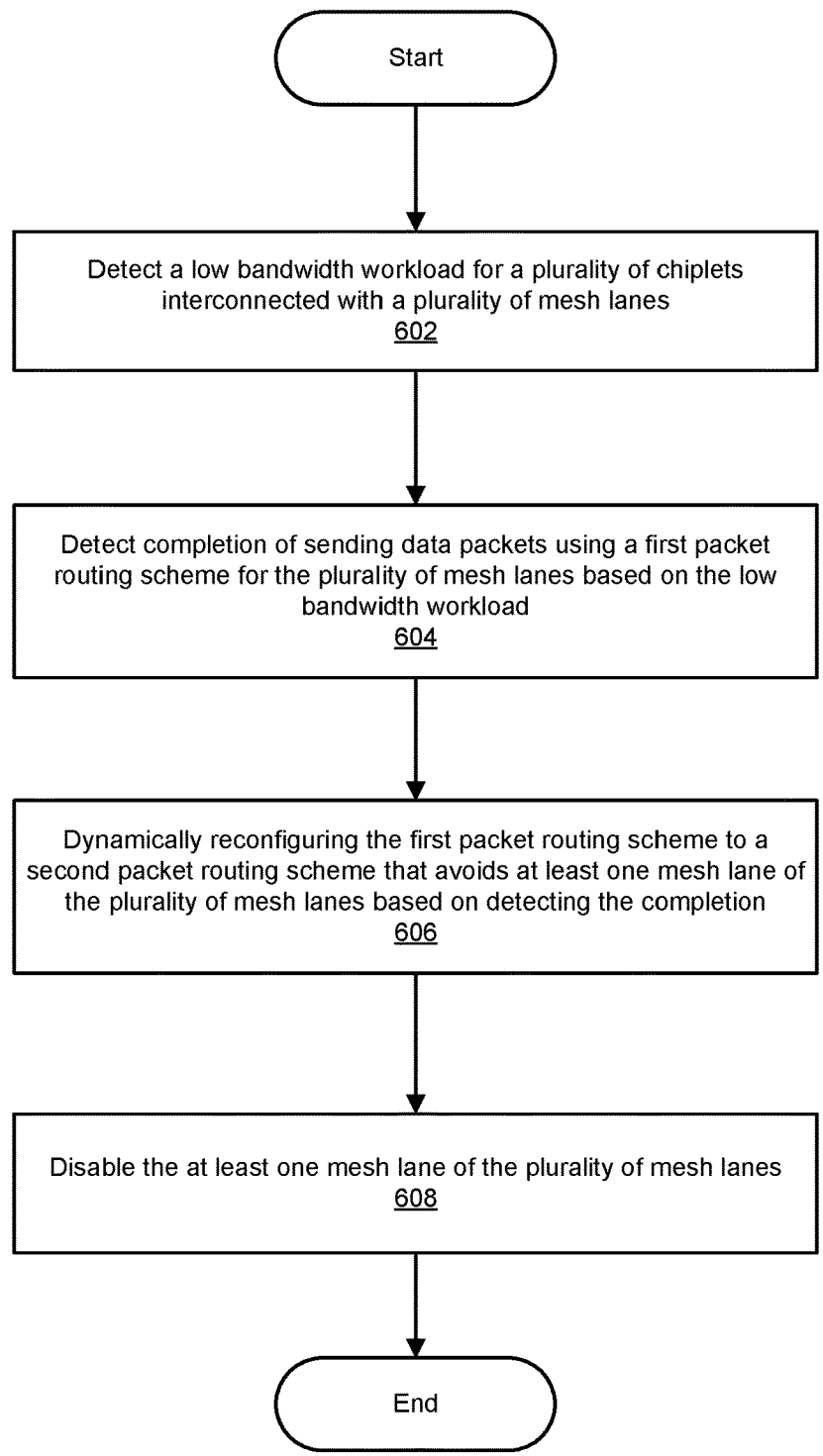
FIG. 6 is a flow diagram of an exemplary method for reduced mesh lane routing.

FIG. 6 is a flow diagram of an exemplary computer-implemented method 600 for reduced mesh lane routing. The steps shown in FIG. 6 can be performed by any suitable circuit, device, and/or computing system, including the system(s) illustrated in FIGS. 1, 2, and/or 3. In one example, each of the steps shown in FIG. 6 represent an algorithm whose structure includes and/or is represented by multiple sub-steps, examples of which will be provided in greater detail below.

As illustrated in FIG. 6, at step 602 one or more of the systems described herein detect a low bandwidth workload for a plurality of chiplets interconnected with a plurality of mesh lanes. For example, control circuit 112 can detect a low bandwidth workload for multiple iterations of chiplet 130 that are interconnected by multiple iterations of mesh lane 118. In some examples, the multiple iterations of chiplet 130 can correspond to homogeneous chiplets such that detecting the low bandwidth workload can be coordinated across the chiplets, although in other examples (e.g., for heterogenous chiplets), the detecting can be performed for each chiplet.

At step 604 one or more of the systems described herein detect completion of sending data packets using a first packet routing scheme for the plurality of mesh lanes based on the low bandwidth workload. For example, control circuit 112 can wait for completion of data packets sent across the iterations of mesh lane 118 using a current routing scheme. In some examples, the low bandwidth workload corresponds to a low multimedia workload or a low display workload. In some examples (e.g., homogeneous chiplets or heterogeneous chiplets), detection of completion of sending data packets can be performed per client per chiplet.

At step 606 one or more of the systems described herein dynamically reconfigure the first packet routing scheme to a second packet routing scheme that avoids at least one mesh lane of the plurality of mesh lanes based on detecting the completion. For example, control circuit 112 can reconfigure the routing scheme to a reduced mesh lane routing scheme. In some examples (e.g., homogeneous chiplets or heterogeneous chiplets), dynamically reconfiguration can be performed per client per chiplet.

The systems described herein can perform step 606 in a variety of ways. In one example, dynamically reconfiguring the packet routing scheme includes maintaining a packet ordering or allowing packet delays as described herein.

At step 608 one or more of the systems described herein disable the at least one mesh lane of the plurality of mesh lanes. For example, control circuit 112 can disable at least one iteration of mesh lane 118 that is unused in the reduced mesh lane routing scheme. In some examples (e.g., homogeneous chiplets), disabling mesh lanes can be coordinated across all chiplets.

In some examples, control circuit 112 can detect a workload increase and in response to detecting the workload increase, enable the disabled at least one mesh lane.

As detailed above, in certain SOCs, mesh lanes can be used to interleave transactions across multiple symmetric links crossing between adjacent chiplets or running internal in a die for through-traffic between other dies. Interleaving can be based on address hash, tag bits, or destination. The number of mesh lanes often scales with the amount of inter-die traffic. For example, the number of mesh lanes between neighbors can be on the order of total memory channels to satisfy the most memory bound workloads, which are often graphics based.

However, when system is in static screen or doing video playback while a graphics engine is idle, both low bandwidth workloads, a small amount of mesh lane bandwidth is used. However, keeping all the mesh lanes powered on, when the bandwidth can be handled with a subset of the mesh lanes, results in inefficient power consumption. Reduced mesh lane routing during stutter as described herein can be used to avoid the power waste, by allowing display stutter and multimedia stutter to dynamically reconfigure the routes taken by display and multimedia traffic to use fewer mesh lanes while still providing sufficient bandwidth due to the lowered chiplet requirements, so that unused mesh lanes and chiplet links can used reduced power or be powered off.

Dynamically rerouting traffic to the subset of mesh lanes can create complexity. When entering the reduced mesh lane operation, the interleaved packets (e.g., full mesh lane operation) can be fully transmitted before transitioning. The traffic can then be dynamically rerouted, and the unused links/mesh lanes powered down. When exiting, the mesh lanes can be powered on again, and if the packet order needs to be preserved, the traffic during the reduced mesh lane operation can be fully transmitted before transitioning.

Thus, reducing the number of mesh lanes used allows for improved power efficiency (e.g., less power consumption) during stutter. Dynamic rerouting of mesh lanes also includes transitioning from full mesh lane operation to reduced mesh lane operation and specialization for certain clients (e.g., stutter clients).

As detailed above, the circuits, devices, and systems described and/or illustrated herein broadly represent any type or form of computing device or system capable of executing computer-readable instructions. In their most basic configuration, these computing device(s) each include at least one memory device and at least one physical processor.

In some examples, the term "memory device" generally refers to any type or form of volatile or non-volatile storage device or medium capable of storing data and/or computer-readable instructions. In one example, a memory device stores, loads, and/or maintains one or more of the modules and/or circuits described herein. Examples of memory devices include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, or any other suitable storage memory.

In some examples, the term "physical processor" generally refers to any type or form of hardware-implemented processing unit capable of interpreting and/or executing computer-readable instructions. In one example, a physical processor accesses and/or modifies one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), systems on a chip (SoCs), digital signal processors (DSPs), Neural Network Engines (NNEs), accelerators, graphics processing units (GPUs), portions of one or more of the same, variations or combinations of one or more of the same, or any other suitable physical processor.

In some implementations, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:
1. A device comprising:
a plurality of mesh lanes for sending data packets across the device between a first crossbar and a second crossbar; and
a control circuit configured to:
reroute data packets to avoid at least one mesh lane of the plurality of mesh lanes, based on a low bandwidth workload; and
disable the at least one mesh lane of the plurality of mesh lanes with a remainder of the plurality of mesh lanes remaining enabled.

2. The device of claim 1, wherein the control circuit is further configured to enable the disabled at least one mesh lane of the plurality of mesh lanes based on a workload increase.

3. The device of claim 1, wherein the control circuit is further configured to complete sending previously routed data packets before disabling the at least one mesh lane of the plurality of mesh lanes.

4. The device of claim 1, wherein rerouting the data packets comprises dynamically reconfiguring a packet routing scheme for the plurality of mesh lanes during live traffic on the plurality of mesh lanes.

5. The device of claim 4, wherein dynamically reconfiguring the packet routing scheme includes maintaining packet deadlines.

6. The device of claim 4, wherein dynamically reconfiguring the packet routing scheme includes maintaining a packet ordering and allowing packet delays.

7. The device of claim 1, further comprising a plurality of chiplets, wherein the plurality of mesh lanes sends data packets to the plurality of chiplets.

8. The device of claim 7, wherein a mesh lane of the plurality of mesh lanes sends data packets across a first chiplet of the plurality of chiplets to a second chiplet of the plurality of chiplets.

9. The device of claim 1, wherein avoiding the at least one mesh lane of the plurality of mesh lanes corresponds to avoiding at least one port of a plurality of ports of the device.

10. The device of claim 1, wherein the low bandwidth workload corresponds to at least one of a low display workload, a low multimedia workload, and a system idle.

11. A system comprising:
a physical memory;
a plurality of chiplets;
a plurality of mesh lanes for sending data packets across the plurality of chiplets between a first chiplet of the plurality of chiplets and a second chiplet of the plurality of chiplets; and
a control circuit configured to:
  detect a low bandwidth workload for the plurality of chiplets;
  dynamically reconfigure a packet routing scheme for the plurality of mesh lanes to avoid at least one mesh lane of the plurality of mesh lanes based on the low bandwidth workload; and
  disable the at least one mesh lane of the plurality of mesh lanes with a remainder of the plurality of mesh lanes remaining enabled.

12. The system of claim 11, wherein the control circuit is further configured to enable the disabled at least one mesh lane of the plurality of mesh lanes based on a workload increase.

13. The system of claim 11, wherein the control circuit is further configured to complete sending previously routed data packets before disabling the at least one mesh lane of the plurality of mesh lanes.

14. The system of claim 11, wherein dynamically reconfiguring the packet routing scheme includes maintaining packet deadlines or maintaining a packet ordering.

15. The system of claim 11, wherein a mesh lane of the plurality of mesh lanes sends data packets across a first chiplet of the plurality of chiplets to a second chiplet of the plurality of chiplets.

16. The system of claim 11, wherein the low bandwidth workload corresponds to at least one of a low multimedia workload, a low display workload, and a system idle.

17. A method comprising:
detecting a low bandwidth workload for a plurality of chiplets interconnected with a plurality of mesh lanes between a first chiplet of the plurality of chiplets and a second chiplet of the plurality of chiplets;
detecting completion of sending data packets using a first packet routing scheme for the plurality of mesh lanes based on the low bandwidth workload;
in response to detecting the completion, dynamically reconfiguring the first packet routing scheme to a second packet routing scheme that avoids at least one mesh lane of the plurality of mesh lanes based on the completion; and
disabling the at least one mesh lane of the plurality of mesh lanes with a remainder of the plurality of mesh lanes remaining enabled.

18. The method of claim 17, further comprising:
detecting a workload increase; and
enabling the disabled at least one mesh lane of the plurality of mesh lanes based on the workload increase.

19. The method of claim 17, wherein dynamically reconfiguring the packet routing scheme includes maintaining packet deadlines or maintaining a packet ordering.

20. The method of claim 17, wherein the low bandwidth workload corresponds to at least one of a low multimedia workload, a low display workload, and a system idle.

* * * * *